March 11, 1952     J. T. WALLMARK     2,589,173
POWER SUPPLY CIRCUIT FOR MULTIPLIER VACUUM TUBES
Filed Oct. 22, 1948     3 Sheets-Sheet 1

INVENTOR
JOHN T. WALLMARK
BY
ATTORNEY

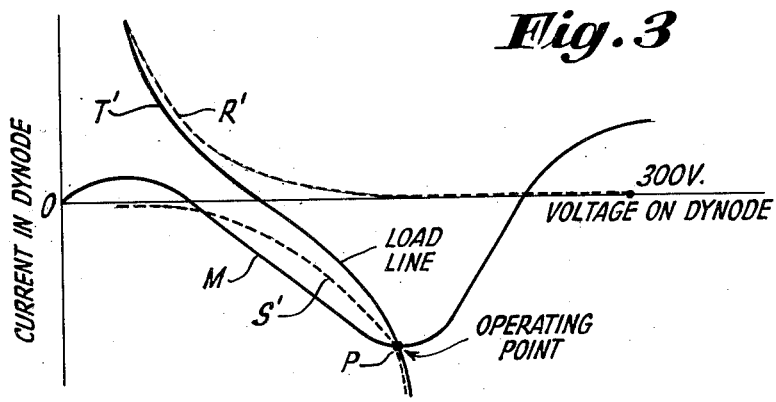
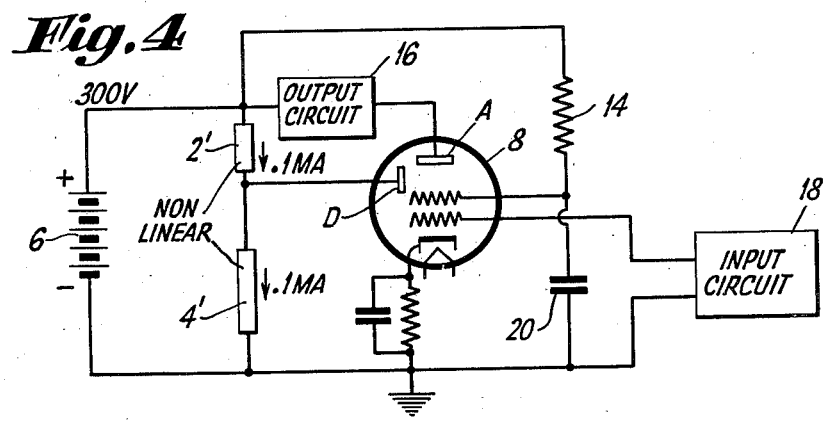
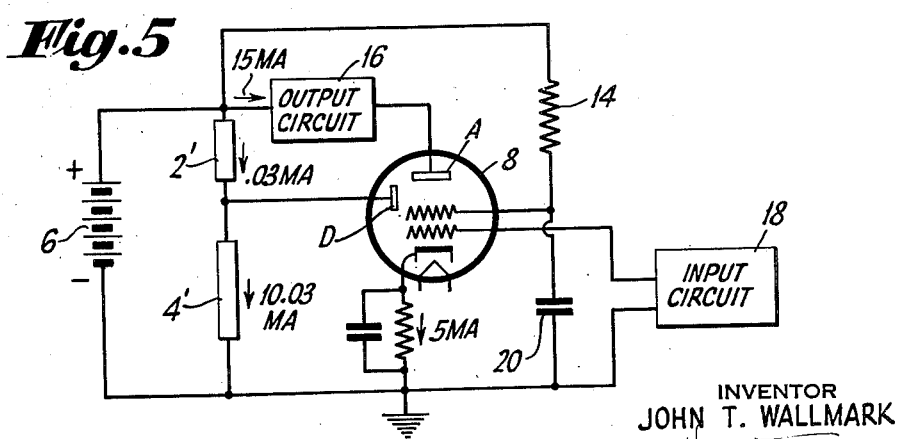

Patented Mar. 11, 1952

2,589,173

UNITED STATES PATENT OFFICE 2,589,173

POWER SUPPLY CIRCUIT FOR MULTIPLIER VACUUM TUBES

John Torkel Wallmark, Princeton, N. J., assignor to Radio Corporation of America, a corporation of Delaware Application October 22, 1948, Serial No. 55,884

7 Claims. (Cl. 179—171)

This invention relates to power supply circuits, and particularly to a power supply bleeder circuit for grid-controlled secondary emission multiplier tubes.

In using grid-controlled secondary emission multiplier tubes, known practice dictates the need for a low impedance bleeder circuit for supplying a suitable operating potential for the secondary emissive electrode (the dynode) in order to obtain stable operating conditions in the tube. The use of such a low impedance bleeder circuit is a serious drawback because of its relatively large current consumption. Although the use of a high impedance bleeder circuit would be preferred because it would draw less current from the unidirectional current source supplying the bleeder circuit, it is known that such a high impedance bleeder circuit causes unstable operation in the tube.

This can be explained by referring to Fig. 1 showing graphically the current versus voltage characteristic of the dynode in a grid-controlled secondary emission multiplier tube operating as an amplifier. This characteristic is a curve identified as M, which at the zero line near the ordinate (at the left) rises slightly above the zero line and then falls below the line with increase in voltage until a peak is reached at point P, after which the curve again rises above the zero line. That portion of the dynode curve M which is above the zero line indicates a region in which the dynode receives electrons from the cathode, while that portion below the zero line indicates a region in which the dynode loses electrons to the collector or anode, by virtue of the secondary emission action of the dynode. The point P on the peak below the zero line is the desired operating point for the tube because the secondary emission from the dynode is a maximum at this point. Since the intersection of the load line of the bleeder circuit as a whole, and the dynode curve M on more than one point would means unstable operation of the tube (it being desired that the intersection be through point P), it will be seen that the load line should not have a slope lower than that indicated by the straight dash line CP.

It will be understood, of course, that the load line depends upon the values of the resistors in the bleeder circuit. The lower the values of the resistors in the bleeder circuit connected to the dynode (that is, a lower impedance for the bleeder circuit), the more nearly vertical will be the load line; stated in another way, the higher the value of the resistors in the bleeder circuit (that is, a higher impedance for the bleeder circuit), the lower will be the slope of the load line. It will thus be seen that the value of the resistors in the bleeder circuit cannot be increased beyond a certain point in order to reduce the large current consumption because of the necessity of maintaining stability in operation of the tube and circuit.

In power supply circuits for tubes of the grid-controlled secondary emission type, the use of linear resistors in the bleeder circuit requires a power dissipation in these resistors comparable to or greater than that consumed by the tube. This results in wasteful power dissipation.

An object of the present invention is to minimize the unavoidable power dissipation occurring in feeding the dynode of the grid-controlled secondary emission tube from a suitable supply source.

Another object is to enable the operation of tubes of this type with a maximum of efficiency and a consequent mimimum drain on the power supply.

A further object is to obtain the maximum amount of stability in a grid-controlled secondary emission multiplier tube with a minimum amount of power loss.

A still further object of the invention is to provide a high impedance bleeder circuit having a curved load line which intersects the dynode characteristic at only the desired operating point.

The foregoing objects are achieved in accordance with the present invention by employing non-linear resistors of relatively high resistance in the bleeder circuit and selected to provide a curved load line intersecting the dynode characteristic at only the desired operating point. These non-linear resistors have as high a value of resistance as possible, with due regard to the stability of operation of the tube, and thus provide a bleeder circuit of high impedance. One such non-linear resistor which may be employed in the practice of the invention is known as Thyrite whose resistance changes with the flow of current therethrough. Thyrite is a silicon-carbide ceramic material, dense and mechanically strong, having non-linear resistance characteristics; the resistance varying as a power of the applied voltage. As is well known, Thyrite is a material whose resistance is continuously decreased as the voltage applied across it is increased. Its resistance characteristic is stable, and substantially independent of polarity or frequency.

A more detailed description of the invention follows in conjunction with a drawing, wherein:

Fig. 1 graphically illustrates the voltage versus current characteristic of the dynode of a grid-controlled secondary emission multiplier tube in association with suitable load lines, when used in circuit with a conventional low impedance bleeder circuit employing linear resistors, given for purposes of exposition;

Fig. 2 illustrates a conventional type of bleeder circuit connected to a grid-controlled secondary emission multiplier tube, in an amplifier system and which produces the graphical representations shown in Fig. 1;

Fig. 3 graphically illustrates the voltage versus current characteristic of the same tube of Fig. 2 and associated load lines, when used in association with the bleeder circuit of the invention, in accordance with the system of Figs. 4 and 5;

Figs. 4 and 5 illustrate the invention applied to an amplifier circuit embodiment utilizing the grid-controlled secondary emission multiplier tube; in the tube cut-off and operating conditions, respectively, and utilizing a bleeder circuit having two non-linear resistors;

Figure 2:
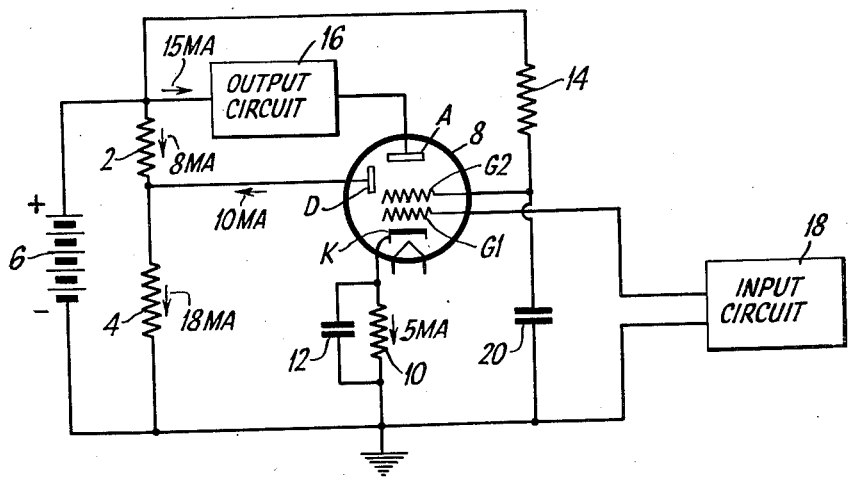

Referring to Fig. 2 showing the conventional or known type of bleeder circuit feeding a grid-controlled secondary emission multiplier tube, the bleeder circuit comprises a pair of ordinary linear resistors 2 and 4 arranged in series and connected across a battery 6. The bleeder circuit and battery constitute a power supply for the tube 8 here connected in an amplifier circuit. The tube 8 comprises an evacuated envelope enclosing an indirectly heated cathode K, a control grid G1, a screen grid G2, an anode or collector electrode A, and a secondary emission multiplier electrode or dynode D. The dynode is adapted to be impinged upon by primary electrons from the cathode, as a result of which it releases numerous secondary electrons at a ratio greater than unity (preferably 3:1 or greater), and these secondary electrons are collected by the anode or collector A.

The dynode is connected to the junction between linear resistors 2 and 4 of the bleeder circuit, while the anode A and cathode K are connected to those terminals of the bleeder circuit which directly connect with the battery 6.

The cathode is connected to ground through a cathode resistor 10 shunted by a bypass condenser 12. The screen grid G2 is connected to the positive terminal of the battery 6 through a dropping resistor 14 and is bypassed to ground by bypass condenser 20. A suitable output circuit 16 which may be a tuned circuit or a filter is coupled between the anode A and the positive terminal of battery 6, as shown. A suitable input circuit 18 (tuned circuit or otherwise) is connected between the control grid and the cathode resistor, as shown. Such an amplifier circuit may be used to amplify low or high frequencies anywhere in the range of, let us say, 1 cycle to 200 megacycles. The vacuum tube 8 is merely shown schematically, and is well known in the art, and no claim is made thereto or to the amplifier arrangement of Fig. 2.

Figure 1:
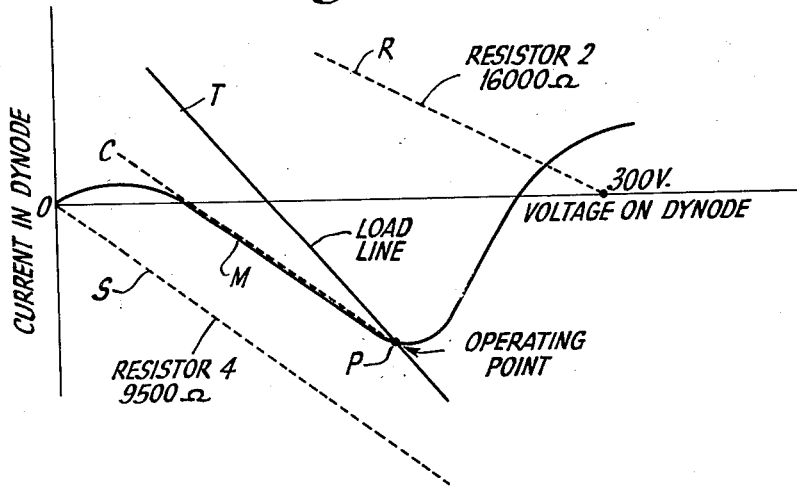

In an amplifier circuit set up in accordance with Fig. 2, the battery 6 furnished 300 volts between its terminals. Resistor 2 was 16,000 ohms and resistor 4 was 9500 ohms. In operation, with current flowing in the tube 8, the flow of current to the anode was 15 ma. (milliamperes), the flow of current through resistor 2 was 8 ma., the flow of current through resistor 4 was 18 ma., while the flow of current from the dynode was 10 ma. The dynode characteristic and the load lines of the tube and circuit of Fig. 2 are approximately as shown in Fig. 1. An inspection of Fig. 1 shows the load lines for resistors 2 and 4, considered individually, as straight lines R and S respectively. The straight load line T represents the two resistors 2 and 4 considered in parallel. It should be noted that the load line T passes through the operating point P on the dynode characteristic M and intersects the dynode curve at only a single point, which is a requirement for stability of operation of the tube.

Figs. 4 and 5 show a bleeder circuit of the invention as including non-linear resistors 2' and 4' connected to the grid-controlled secondary emission multiplier tube 8 in a manner similar to the circuit of Fig. 2. The same elements in all Figs. 2, 4 and 5 are represented by the same reference numerals, while the non-linear resistors of Figs. 4 and 5 have been given the same reference numerals as the correspondingly located resistors of Fig. 2 but with prime designations. The resistors 2' and 4' actually used in the embodiment of Figs. 4 and 5 were Thyrite resistors.

The current designations in the circuit components of Figs. 4 and 5 indicate the amount of current flow therein for the conditions of tube cut-off and tube operating, respectively. It should be noted that with the tube 8 cut-off, as in Fig. 4, the current through non-linear resistors 2' and 4' was approximately .1 ma. This compares to a current of 12 ma., in each of the linear resistors 2 and 4 of Fig. 2 for the same tube in the cut-off condition.

During the operating condition of the tube 8 with the bleeder circuit of the invention, the current through the non-linear resistor 2' was .03 ma. while the current through the non-linear resistor 4' was 10.03 ma. Actually, it is only the current through the non-linear resistor 2' which represents the undesirable current drain or power loss in the bleeder circuit, because the main current through the non-linear resistor 4' is obtained from the dynode electrode D of the tube 8. This compares with a current of 8 ma. and 18 ma. through the linear resistors 2 and 4 of the system of Fig. 2. Of this 18 ma. through the resistor 4 of Fig. 2, the dynode supplied 10 ma. The designation 15 ma. in Fig. 5 designates the current flowing through the output circuit to the output electrode A of tube 8. It will thus be seen that the bleeder circuit of Fig. 5 utilizes only .03 ma. or .2%, a negligible amount of power, compared to that drawn by the tube from battery 6. In the case of Fig. 2, however, the bleeder utilizes 8 ma. or about 50% compared to the amount drawn by the tube.

The dynode characteristic and the load lines of the tube and circuit of Figs. 4 and 5, are approximately as shown in Fig. 3. It should be noted that the load lines for resistors 2' and 4', considered individually, are curved lines R' and S', respectively. The curved load line T' represents the two resistors 2' and 4' in parallel, or stated in another way, the effective load line for the bleeder circuit. This load line T curves with and follows to some extent the dynode curve over its negative resistance portion and intersects the dynode curve at only the operating point, thus providing a high degree of stability for a high impedance bleeder circuit. It will be evident that I have been able to provide a high impedance bleeder circuit of non-linear resistors whose load line curves with and can be made to match the dynode curve.

A comparison of above current values for the circuit arrangements of Figs. 2 and 4, for the same conditions of operation clearly indicate that I have reduced to a very considerable extent the power dissipation in the bleeder circuit by the system of the invention. At the same time the stability at the operating point has been considerably improved as the slope of the curved load line through P is easily made higher than that of the corresponding straight load line. Thus the tube can be made less sensitive to changes in operating conditions, such as line voltage.

The advantages of the invention may also be achieved by making the resistor 4' of Figs. 4 and 5 as non-linear and resistor 2 as a conventional linear resistor, thereby saving the cost of one non-linear resistor. The non-linear resistor is more expensive than the conventional linear resistor.

Figure 6:
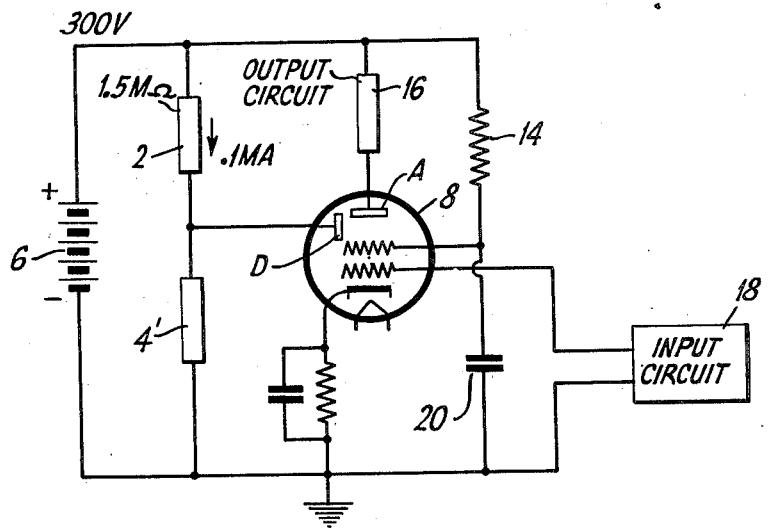
Fig. 6 illustrates another embodiment of the invention utilizing a bleeder circuit employing a combination of linear and non-linear resistors.

An arrangement utilizing one non-linear resistor and one linear resistor is shown in Fig. 6 which illustrates a circuit arrangement identical to Figs. 4 and 5 except for the foregoing difference. The same elements in all three of these figures have been given the same reference characters. In Fig. 6, the linear resistor is identified as 2 while the non-linear resistor is identified as 4'. The linear resistor 2 may have a value of 1.5 megohms.

Figure 7:
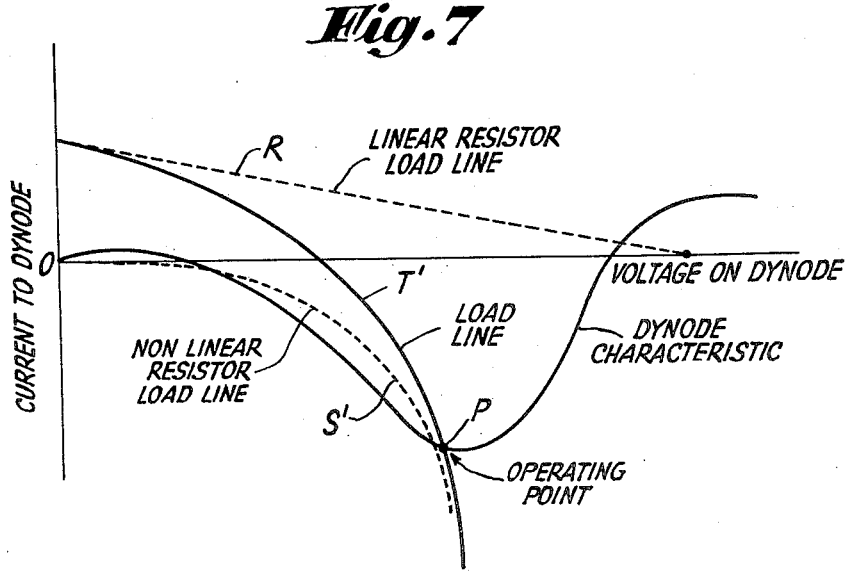
Fig. 7 graphically illustrates the voltage versus current characteristic of the tube of Fig. 6 and the associated load lines.

Fig. 7 graphically illustrates the voltage versus current characteristics of the grid-controlled secondary emissive multiplier tube in association with suitable load lines for the condition of Fig. 6 wherein the bleeder circuit is a combination of linear and non-linear resistors. It should be noted that the effective load line T' of the bleeder circuit representing the two resistors 2 and 4' in parallel in Fig. 7 is curved and intersects the dynode curve at only the operating point.

Although the invention has been described with particular reference to amplifier circuits, it should be understood that the invention is not limited to an amplifier but is useful in any system requiring a tube having a secondary emissive electrode in which the electron current is in the reverse direction from normal.

What is claimed is:

1. In an amplifier system, a multiplier vacuum tube having a control grid, a screen grid, a cathode, a dynode and a collector electrode, a power supply circuit comprising a source of unidirectional potential and a pair of non-linear resistors connected in series and across said source, the value of said resistors continuously decreasing with increased voltage applied thereacross, a connection from one side of said source to said collector, a connection from the other side of said source to said cathode, and a connection from the junction of said two resistors to said dynode, a resistor connected between said collector and screen grid, and an input circuit coupled between said control grid and cathode.

2. In combination, a bleeder circuit for use with a secondary emissive electron discharge device having an anode, a cathode and a secondary emissive multiplier electrode, comprising a pair of non-linear resistors connected in series and across a source of unidirectional potential, the value of said resistors continuously decreasing with increased voltage applied thereacross, means for connecting those terminals of said bleeder circuit which are connected to said source to said anode and cathode, and means for connecting the junction of said non-linear resistors to said secondary emissive multiplier electrode.

3. In combination, a secondary emissive multiplier tube having a cathode, a dynode and a collector electrode, a power supply circuit comprising a source of unidirectional potential and a pair of non-linear resistors connected in series and across said source, the value of said resistors continuously decreasing with increased voltage applied thereacross, a connection from one side of said source to said collector, a connection from the other side of said source to said cathode, and a connection from the junction of said resistors to said dynode.

4. In an amplifier system, a multiplier vacuum tube having a control grid, a screen grid, a cathode, a dynode and a collector electrode, a power supply circuit comprising a source of unidirectional potential and a pair of non-linear resistors connected in series and across said source, the value of said resistors continuously decreasing with increased voltage applied thereacross, a connection from one side of said source to said collector, a connection from the other side of said source to said cathode, and a connection from the junction of said resistors to said dynode, a resistor connected between said collector and screen grid, and an input circuit coupled between said control grid and cathode.

5. A system in accordance with claim 3, characterized in this, that said non-linear resistors are made of Thyrite.

6. In an amplifier system, a multiplier vacuum tube having a control grid, a screen grid, a cathode, a dynode and a collector electrode, a power supply circuit comprising a source of unidirectional potential and a pair of non-linear resistors connected in series and across said source, the value of said resistors continuously decreasing with increased voltage applied thereacross, a connection from one side of said source to said collector, a connection from the other side of said source to said cathode, and a connection from the junction of said resistors to said dynode, a resistor connected between said collector and screen grid, an output circuit coupled to said collector, and an input circuit coupled between said control grid and cathode.

7. In combination, a bleeder circuit for use with a secondary emissive electron discharge device having an anode, a cathode and a secondary emissive multiplier electrode, comprising a pair of non-linear resistors connected in series and across a source of unidirectional potential, the value of said resistors continuously decreasing with increased voltage applied thereacross, means for connecting those terminals of said bleeder circuit which are connected to said source to said anode and cathode, and means for connecting the junction of said non-linear resistors to said secondary emissive multiplier electrode, said resistors having such values as to produce a curved load line which curves in the same direction as the secondary emissive multiplier electrode current-voltage characteristic and intersects said multiplier electrode characteristic at only a single point near the point of maximum secondary emission from said multiplier electrode.

JOHN TORKEL WALLMARK.

REFERENCES CITED

The following references are of record in the file of this patent:

UNITED STATES PATENTS

| Number | Name | Date |
|---|---|---|
| 2,032,199 | Braden | Feb. 25, 1936 |
| 2,086,910 | Hansell | July 13, 1937 |
| 2,177,847 | Tamm | Oct. 21, 1939 |
| 2,276,417 | Preisach et al. | Mar. 17, 1942 |
| 2,430,265 | Weisglass | Nov. 4, 1947 |

OTHER REFERENCES

Terman, "Radio Engineering" (first edition 1943), McGraw-Hill Book Co., Inc., page 301.